United States Patent [19]  [11] 3,972,669
Mehnert  [45] Aug. 3, 1976

[54] MULTI-STAGE BLOWMOLDING APPARATUS

[75] Inventor: Gotfried Mehnert, Berlin, Germany

[73] Assignee: Bekum Maschinenfabriken GmbH, Berlin, Germany

[22] Filed: Mar. 21, 1974

[21] Appl. No.: 453,463

[30] Foreign Application Priority Data
Mar. 21, 1973 Germany............... 7310622[U]

[52] U.S. Cl. ............... 425/326 B; 425/DIG. 215; 425/DIG. 211
[51] Int. Cl.² ........................................ B29D 23/03
[58] Field of Search ............ 425/DIG. 215, 326 B, 425/DIG. 205, DIG. 213, DIG.206, DIG. 211, 342

[56] References Cited
UNITED STATES PATENTS

| | | | |
|---|---|---|---|
| 3,396,427 | 8/1968 | Raspante | 425/326 B |
| 3,402,431 | 9/1968 | Fogelberg et al. | 425/DIG. 205 |
| 3,583,031 | 6/1971 | Kader et al. | 425/DIG. 206 X |
| 3,767,747 | 10/1973 | Uhlig | 425/DIG. 215 |
| 3,781,395 | 12/1973 | Uhlig | 425/DIG. 215 |

*Primary Examiner*—Francis S. Hosar
*Assistant Examiner*—David S. Safran
*Attorney, Agent, or Firm*—Michael J. Striker

[57] ABSTRACT

A mutli-stage blowmolding apparatus wherein a carriage is reciprocable between first and second positions and supports two open-and-shut molds which are operable independently of each other. In the first position of the carriage, one of the molds receives a parison which is being extruded from the nozzle of an extruder while the other of the molds receives a preform which is suspended on the blowing mandrel of a first blowing unit. The mandrel is withdrawn before the one mold closes around a freshly extruded parison and the carriage is immediately moved to the second position in which the parison in the cavity of the one mold is in register with the first blowing unit and can be expanded by the blowing mandrel to be thereby converted into a preform. At the same time, the preform in the other mold registers with the blowing mandrel of a second blowing unit which converts the preform into a bottle or another hollow shaped article. The molds are thereupon opened and the carriage is returned to the first position. The preform remains suspended on the mandrel of the first blowing unit and the shaped article remains suspended on the mandrel of the second blowing unit or is ejected from the other mold during movement of the carriage to its first position.

The carriage may support a discrete operating mechanism for each of the two molds, or such operating mechanism may include two platens for the sections of the two molds and springs or other biasing means for moving the sections of the other mold relative to the respective platens.

11 Claims, 10 Drawing Figures

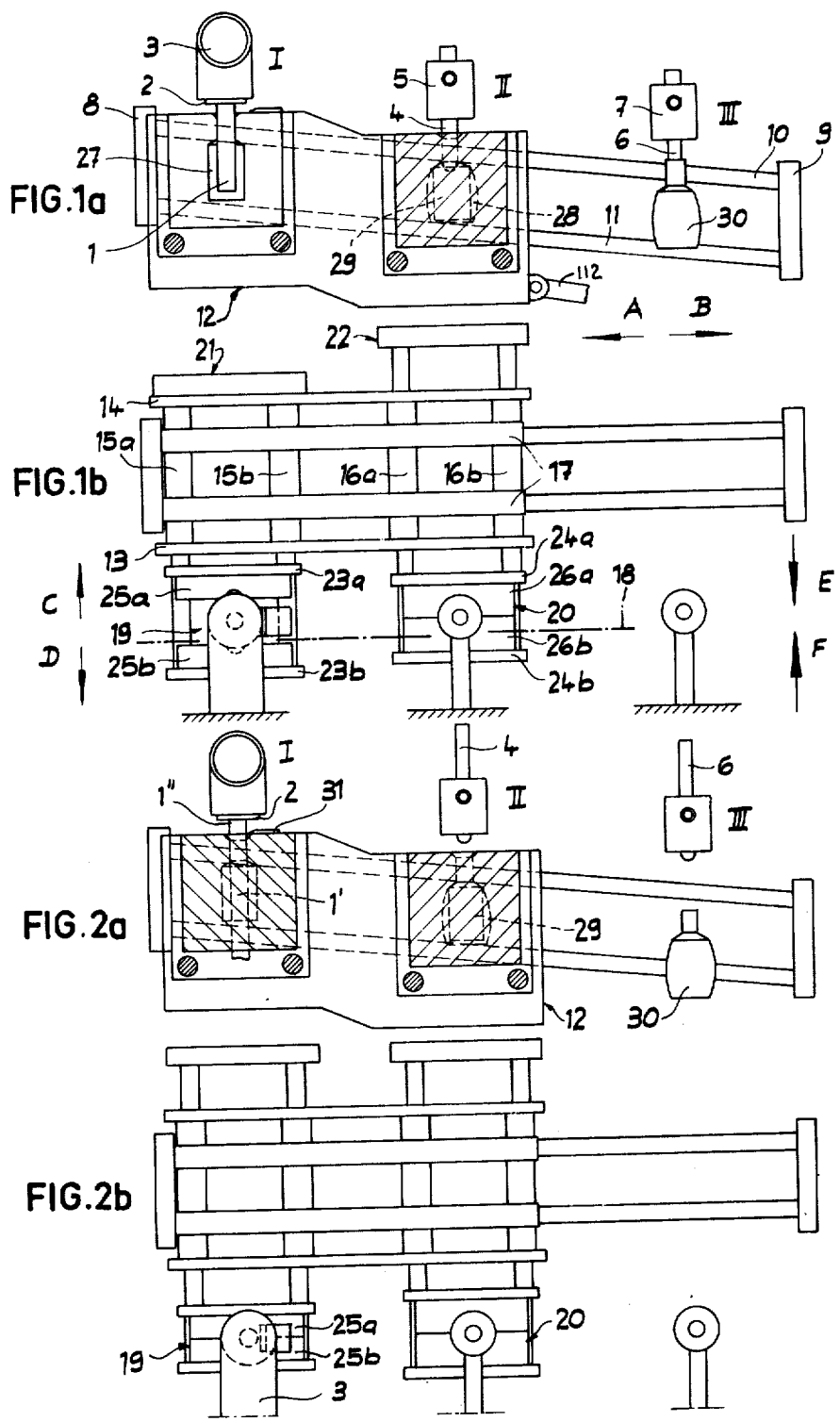

MULTI-STAGE BLOWMOLDING APPARATUS

BACKGROUND OF THE INVENTION

The present invention relates to blowmolding apparatus in general, and more particularly to improvements and blowmolding apparatus wherein the conversion of tubular or strip-shaped parisons into bottles or other types of hollow shaped articles takes place in several stages.

It is already known to convert tubular or strip-shaped parisons of plasticized synthetic thermoplastic material into hollow shaped articles in two stages the first of which includes converting the parison into a hollow blank or preform and the second of which includes converting the blank into a finished hollow article. As a rule, the conversion of parisons into preforms and the conversion of preforms into shaped articles involves blowing a gaseous medium into the parisons and preforms by resorting to blowing mandrels or blowpipes which can cooperate with the respective molds to calibrate the adjacent portions of the preforms and hollow articles. A preform may but need not closely resemble the finished article.

The conversion of preforms into finished hollow articles can be performed by resorting to so-called biaxial stretching of the material of the preforms. This procedure involves maintaining the temperature of the preform within a narrow range for optimum orientation of molecules of the plasticized material and subjecting the preform to a predetermined reproducible stretching or expanding action. The procedure is known as injection molding if the mold for conversion of parisons into preforms receives a parison which is injected into the mold cavity.

U.S. Pat. No. 2,715,751 to Weber discloses an apparatus with several finishing molds which travel continuously or intermittently along an endless path and each of which can be opened and closed independently of the others. The space requirements and such apparatus are excessive and the initial and maintenance cost is very high.

German printed publication No. 1,084,908 discloses a modified apparatus with two molds which open and close simultaneously. A drawback of such apparatus is that the opening of that mold wherein the treatment of plasticized material is already completed cannot precede the opening of the other mold wherein the treatment requires a longer interval of time. As a rule, the mold which is used to convert preforms into finished hollow articles must remain closed for an interval of time which is longer than the minimum interval necessary for maintaining the mold for the making of preforms in closed position. Moreover, the just described apparatus is used for conversion of injection molded parisons rather than for conversion of extruded parisons. Therefore, certain problems which arise in connection with the treatment of extruded parisons are non-existent in the just described conventional apparatus. Such problems include those which are attributable to the fact that the nozzle of an extruder continues to supply plasticized material during each stage of operation of an extrusion blowmolding apparatus, i.e., also during that interval when the mold which accepts successive extruded parisons is closed and is still located at the extruding station. If the mold for the making of preforms opens and closes simultaneously with opening and closing of the mold for the making of finished hollow articles, the two molds can be moved as a unit only after the second mold is free to move, i.e., subsequent to withdrawal of a blowing mandrel from the mold for finished articles. It has been found that such delayed transport of the mold for conversion of parisons into preforms from the extruding station can affect the appearance and/or quality of the extruded material.

SUMMARY OF THE INVENTION

An object of the invention is to provide a novel and improved apparatus for conversion of extruded parisons into hollow shaped articles in several stages without interfering with continuous extrusion of plasticized material at the extruding station.

Another object of the invention is to provide a multi-stage blowmolding apparatus wherein the molds for conversion of strip-shaped or tubular parisons into preforms and for conversion of preforms into hollow shaped articles are controlled in a novel and improved way so as to prevent the mold for conversion of parisons into preforms from interfering with continuous extrusion of plasticized material.

A further object of the invention is to provide a multi-stage apparatus wherein the conversion of extruded parisons into hollow shaped articles takes up less time than in heretofore known apparatus.

An additional object of the invention is to provide a multi-stage blowmolding apparatus which can be readily and rapidly converted for the making of larger, smaller or differently configurated shaped articles, and which can be used for the making of shaped articles from a variety of synthetic thermoplastic materials.

The invention is embodied in an apparatus for converting plasticized parisons consisting of synthetic thermoplastic material into hollow shaped articles. The apparatus comprises means for extruding a succession of parisons at a first station, a first blowing unit which is located at a second station laterally spaced from the first station and includes means for expanding parisons into hollow blanks or preforms, a second blowing unit which is located at a third station laterally spaced from the second station and includes means for expanding hollow blanks into shaped articles, a carriage, first and second multi-section open-and-shut molds mounted on the carriage, means for moving the carriage along a predetermined path between a first position in which the first mold registers with the extruding means to receive a parison and the second mold registers with the first blowing unit to accept therefrom a hollow blank, and a second position in which the first mold registers with the first blowing unit for expansion of the parison therein into a hollow blank and the second mold registers with the second blowing unit for conversion of the blank therein into a shaped article, and operating means for opening and/or closing at least one of the first and second molds independently of the other mold.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWINGS

FIG. 1a is a schematic partly elevational and partly vertical sectional view of a multi-stage blowmolding apparatus with the carriage shown in its first position and with the first mold in open position;

FIG. 1b is a plan view of the structure shown in FIG. 1a;

FIG. 2a illustrates the structure of FIGS. 1a–1b in the view of FIG. 1a but with the first mold in closed position;

FIG. 2b is a plan view of the structure shown in FIG. 2a;

FIG. 3b is a plan view of the structure shown in FIG. 3a;

FIG. 4b is a plan view of the structure shown in FIG. 4a;

DESCRIPTION OF THE PREFERRED EMBODIMENTS

Figure 3A:
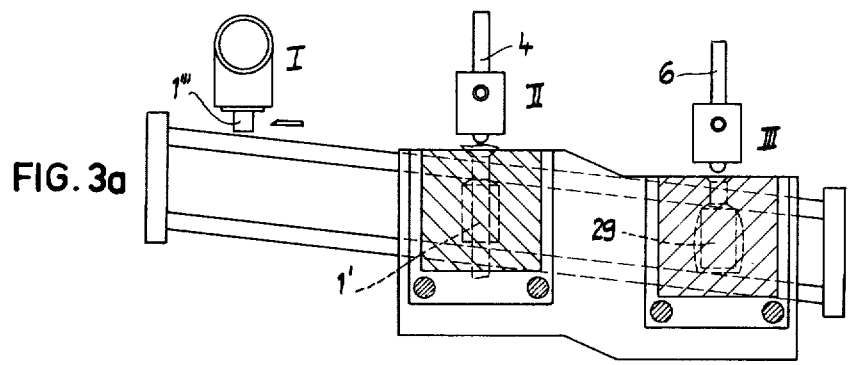
FIG. 3a illustrates the structure of FIGS. 1a–2b but with the carriage in its second position and with each of the two molds in closed position.

FIGS. 1a and 1b illustrate a multi-stage blowmolding apparatus which comprises an extruding unit including a conventional screw- or ram-type extruder 3 and a nozzle 2 serving to produce a continuous tube 1. The material of the tube 1 is a synthetic plastic substance which is extruded in plasticized condition so that the parisons which are separated from the tube can be expanded in several stages to be converted into bottles 30 or analogous hollow shaped articles. The extruding unit including the parts 2, 3 is located at a first station I which is disposed laterally of and at a level above a second station II for a first blowing unit having a vertically movable blowing mandrel 4 and a device 5 for moving the mandrel 4 as well as for supplying to the axial bore of the mandrel 4 a stream of a gaseous blowing medium which serves to expand successive parisons into hollow blanks or preforms 29 each of which may resemble a finished shaped article 30. The second station II is located laterally of and at a level above a third station III for a second blowing unit which includes a vertically movable blowing mandrel 6 and a device 7 which is analogous to the device 5 at the station II. The blowing medium which is admitted into the axial bore of the mandrel 6 serves to convert successive blanks or preforms 29 into shaped articles 30.

The apparatus further comprises two open-and-shut blow molds 19, 20 which are mounted on a carriage or support 12. The latter is reciprocable along a predetermined path between a first position shown in FIGS. 1a, 1b, 2a, 2b and a second position shown in FIGS. 3a, 3b, 4a, 4b. The guide means for confining the carriage 12 to movement along the predetermined path between the first and second positions includes two pairs of parallel tie rods 10 and 11 which are inclined with respect to a horizontal plane to the extent which corresponds to differences between the levels of the stations I, II and III. The carriage 12 has elongated sleeve-like followers 17 which surround and are slidable lengthwise of the tie rods 10 and 11. The means for moving the carriage 12 between the first and second positions may include a suitable prime mover (e.g., a hydraulic or pneumatic cylinder and piston unit which includes an output element coupled to the carriage). FIG. 1a merely shows the piston rod 112 of a double-acting hydraulic or pneumatic cylinder which can move the carriage 12 in directions indicated by arrows A and B. The carriage moves in the direction of arrow A during travel from the second toward the first position and in the direction of arrow B during travel from the first to the second position. The piston rod 112 is shown as being articulately connected to the carriage 12 and the cylinder for the piston rod is assumed to be articulately connected to the frame of the blowmolding apparatus. The ends of the tie rods 10 and 11 are secured to plate-like frame members 8 and 9.

The carriage 12 comprises two upright walls 13, 14 which are located at the opposite sides of the tie rods 10, 11 and are connected to each other by two sets of transversely extending tubular members 15a, 15b and 16a, 16b. These tubular members can be secured to the sleeve-like followers 17 of the carriage 12. The tubular members 15a, 15b support the first mold 19 which includes two platens 23a, 23b and two mold sections 25a, 25b which are respectively secured to the platens 23a, 23b and define a cavity 27 when the mold 19 is closed. The front or outer surfaces of the mold sections 25a, 25b then abut against each other in a vertical plane 18 which is indicated by a phantom line. The operating means 21 for opening and closing the mold 19 is mounted on the wall 14 of the carriage 12 and may include one or more double-acting cylinder and piston units which move the sections 25a, 25b apart before the mold 19 moves from register with the blowing unit at the station II toward register with the extruding unit at the station I and close the mold sections 25a, 25b around a freshly extruded parison 1' when the carriage 12 reaches its first position.

The second mold 20 is supported by the tubular members 16a, 16b and includes two platens 24a, 24b for mold sections 26a, 26b which define a second mold cavity 28 when the mold 20 is closed by a second operating means 22 on the wall 14 of the carriage 12. The operating means 22 can open and close the mold 20 independently of the closing and opening of mold 19 by the operating means 21. The arrangement is such that the mold 20 is open while the carriage 12 moves toward its first position so that the cavity 28 of the open mold 20 can receive a fresh blank or preform 29 which is suspended on the mandrel 4 at the station II, and that the mold 20 is closed as soon as it moves into register with the blowing unit at the station II, i.e., when the carriage 12 reaches its first position. The front or outer surfaces of the sections 26a, 26b of the closed mold 20 then meet in the aforementioned plane 18. The directions in which the operating means 21 or 22 moves the sections of the respective mold 19, 20 during opening of the mold are indicated by arrows C and D, and the directions in which the mold sections move during closing of the respective molds are indicated by arrows E and F.

The distance between the molds 19, 20 on the carriage 12 is selected in such a way that the cavity 27 of the mold 19 registers with the nozzle 2 at the first station I when the cavity 28 of the mold 20 registers with the mandrel 4 at the station II, and that the cavity 27 of the mold 19 registers with the mandrel 4 when the cavity 28 of the mold 20 registers with the mandrel 6 at the station III.

During a first stage of a complete cycle, the carriage 12 dwells in the first position of FIGS. 1a and 1b. The mold sections 25a, 25b are spaced apart during movement of the carriage 12 toward the position of FIGS. 1a, 1b (arrow A) so that the nozzle 2 can continue with extrusion of tube 1 without any interference on the part of the mold 19. The mold 20 can be closed immediately after the carriage 12 reaches the first position so that its cavity 28 receives the blank or preform 29 which is supported by and extends downwardly from the mandrel 4 which dwells in its lower end position. A finished hollow shaped article 30 is suspended on the mandrel 6 at the station III so that it can be cooled by surrounding air while the mold 20 is located outside of the station III.

The next stage of the cycle includes an actuation of operating means 21 (see FIGS. 2a and 2b) so as to close the mold 19 around a freshly extruded parison 1' of requisite length. This can take place simultaneously with extraction of the mandrel 4 from the freshly formed blank 29 in the cavity 28 of the closed mold 20 at the station II. Also, the mandrel 6 can be lifted so that it is extracted from the neck portion of the article 30 which is free to descend by gravity and to enter a suitable receptacle or to come to rest on a conveyor, not shown. Since the mandrel 4 is withdrawn practically simultaneously with or immediately prior to or immediately after closing of the mold 19 by the operating means 21, the piston rod 112 can begin to move the carriage 12 from the first position of FIGS. 1a–2b substantially simultaneously with complete closing of the mold 19 because the mandrel 4 cannot interfere with movement of the closed mold 20 from the station II toward the station III. The carriage 12 can be moved at a very high speed, and the severing of parison 1' in the cavity 27 of the closed mold 19 from parent material 1" which is being continuously extruded through the annular orifice of the nozzle 2 can take place during movement of the carriage 12 from its first position or simultaneously with at least partial closing of the mold 19. FIGS. 1a and 2a show a severing device having a blade 31 which is movable in a horizontal plane to separate the parison 1' from the parent material 1" at a point above the upper surfaces of the mold sections 25a, 25b.

Figure 3B:
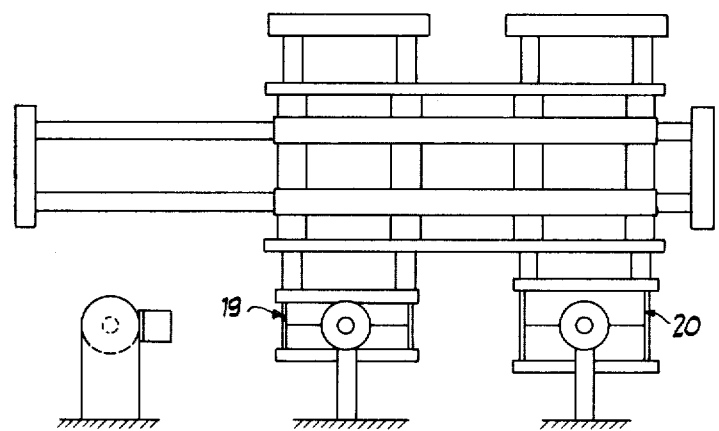
Figure 4A:
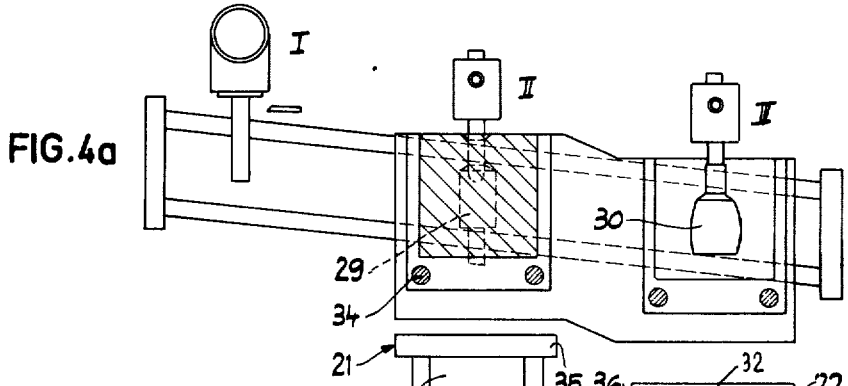
FIG. 4a illustrates the structure of FIGS. 1a–3b in the view of FIG. 3a but with the second mold in open position.
Figure 4B:
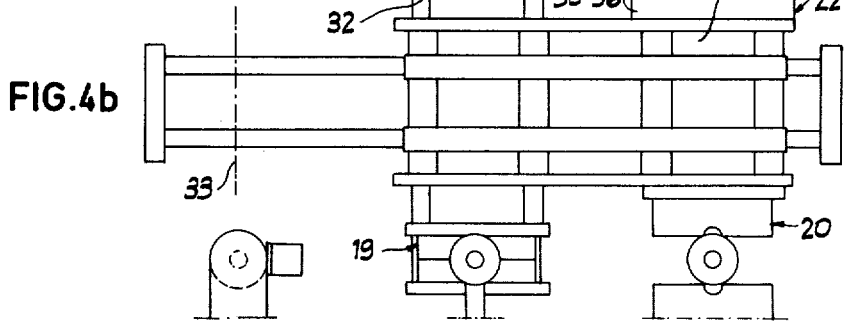

FIGS. 3a and 3b illustrate a further stage of the cycle. The carriage 12 dwells in the second position so that the closed mold 19 registers with the mandrel 4 at the station II and the closed mold 20 registers with the mandrel 6 at the station III. The mandrel 4 is caused to descend and to enter the upper end portion of the parison 1' in the mold cavity 27 of the closed mold 19 (see FIGS. 4a and 4b) as soon as the carriage 12 reaches the position of FIGS. 3a and 3b. The axial bore of the mandrel 4 then admits a blast of a gaseous blowing medium which converts the parison 1' into a blank or preform 29. Such preform may but need not completely fill the cavity 27. The neck portion of the blank 29 adheres to the mandrel 4 so that the mold 19 can be opened by operating means 21 without any appreciable shifting of the blank 29 at the station II. It is presently preferred to introduce the mandrels 4 and 6 into the closed molds 19, 20 as soon as the carriage 12 reaches the second position of FIGS. 3a and 3b. Such positions of the mandrels 4, 6 are shown in FIGS. 4a and 4b. At the same time, the nozzle 2 continues to extrude the parent material 1" so that the latter grows and forms a continuously increasing length of a further parison 1'''.

FIGS. 4a and 4b show that the operating means 22 can open the mold 20 prior to opening of the mold 19 by operating means 21. Such mold of controlling the actuation of operating means 21 and 22 is desirable and advantageous if the hollow shaped article 30 on the mandrel 6 should be subjected to a pronounced cooling action by surrounding air (and/or to a forcible cooling action by induced currents of a cooling medium). For example, a satisfactory cooling of finished articles 30 is desirable prior to detachment from the mandrel 6 if the walls of the articles are rather thin so that they could be deformed in response to descent into a receptacle or onto a conveyor, or when the conveyor or receptacle is located at a level well below the level or an article 30 on the mandrel 6 so that the article is accelerated to a relatively high speed before it comes to rest in the receptacle or on the conveyor upon completed retraction of the mandrel 6.

Inversely, the operating means 21 will open the mold 19 at the station II prior to opening of the mold 20 at the station III by the operating means 22 if the plastic material is to be subjected to a so-called biaxial stretching or expanding action, i.e., when the ratio of dimension of the blanks 29 to dimensions of the articles 30 must be maintained within a very narrow range and the blanks 29 are to be cooled to a temperature which is well below the temperature of parisons before the blanks leave the station II to be transported toward the station III. The mold 19 is then opened well in advance of opening of the mold 20 so as to allow the surrounding air to cool the blank 29 to a desired low temperature before the thus cooled blank is confined in the cavity 28 upon return movement of the carriage 12 to the position of FIGS. 1a–2b. Of course, the blanks 29 should not be overcooled, i.e., they should remain in a deformable state so that they can be converted into hollow articles 30 by the blowing medium supplied through the axial bore of the mandrel 6.

It is clear that the apparatus of FIGS. 1a–4b can be modified in a number of ways without departing from the spirit of the invention. For example, the apparatus may include two extruding units each of which has a discrete nozzle 2 and a discrete extruder 3. The spaces 32 shown in FIG. 4b can receive two additional open-and-shut molds, not shown. The apparatus then comprises two first stations, two second stations and two third stations, and the carriage supports a total of four molds including two molds 19 for the conversion of parisons into blanks and two molds 20 for the conversion of blanks into hollow shaped articles. Moreover, the apparatus of FIGS. 1a–4b can be modified by providing two additional stations II, III which are mirror symmetrical to the illustrated stations II, III with reference to a vertical plane indicated in FIG. 4b by a phantom line 33. The apparatus then comprises two carriages 12 one of which reciprocates the illustrated molds 19, 20 in a manner as shown in FIGS. 1a–4b and the other of which reciprocates two additional molds 19, 20 so that the additional mold 19 receives parisons at the station I when the illustrated carriage 12 travels toward or dwells in its second position or moves toward the first position, and the additional mold 20 moves between the two additional stations II and III.

FIGS. 4a and 4b further show two crossheads 35, 36 which respectively form part of operating means 21, 22 and are connected with the platens 23b, 24b by tie rods 34. The tie rods 34 are slidable in the tubular members 15a, 15b and 16a, 16b. In accordance with a presently preferred embodiment of the invention, the movements of mold sections 25b, 26b away from the plane 18 initiate identical movements of mold sections 25a, 26a away from the plane 18 or vice versa. The platens 23a, 23b may carry toothed racks which mesh with a pinion of the operating means 21 to move the sections 25a, 25b toward or away from each other, depending upon the direction of rotation of the pinion. The construction of the operating means 22 may but need not be identical with that of the operating means 21.

In certain presently known multi-stage blowmolding apparatus, the opening and closing of the mold for the making of blanks or preforms takes place simultaneously with opening and closing of the mold which converts the blanks into shaped articles. Were the apparatus of FIGS. 1a–4b operated in the conventional manner, the mandrel 4 at the station II could be withdrawn from a blank 29 only upon completed closing of the mold 20 around the blank 29. Since the two molds would open and close together, the withdrawal of the mandrel 4 from the blank 29 at the station II would have to follow a complete closing of the mold 19 around a fresh parison at the station I. This would interfere with continuous extrusion of the tube 1, even if the mandrel 4 were withdrawn from a blank 29 in the mold 20 immediately after closing of the mold 20. The material of the continuously extruded tube 1 would be urged against the upper side of the closed mold 19 at the station I so that the leading end of the tube would undergo undesirable deformation and could not be converted into a satisfactory blank 29. Furthermore, the extrusion of tube 1 would proceed during the initial stage of movement of the closed mold 19 from the station I, i.e., while the upper side of the closed mold 19 would move laterally of and away from register with the orifice of the nozzle 2.

The improved apparatus avoids such drawbacks of conventional apparatus by the simple expedient of providing operating means which can open and close the mold 19 independently of the mold 20 and vice versa. This insures that the mold 19 can leave the station I immediately after its sections close around a fresh parison so that the mold 19 does not interfere with further extrusion of the tube even if the carriage 12 is mounted for travel along a horizontal path. Of course, the mounting of carriage 12 for travel along a path which slopes downwardly from the station I toward the station II further reduces the likelihood that the closed mold 19 would interfere with extrusion of the tube at the station I. The movement of mold sections 25a, 25b in directions indicated by arrows E, F (while the carriage 12 dwells in the position shown in FIGS. 1a–2b) can be immediately followed by a movement of the carriage 12 in the direction of arrow B whereby the carriage can undergo an immediate and very high acceleration to thus insure that the nozzle 2 can continue with extrusion of the tube while the closed mold 19 transports the confined parison toward the station II.

Figure 5:
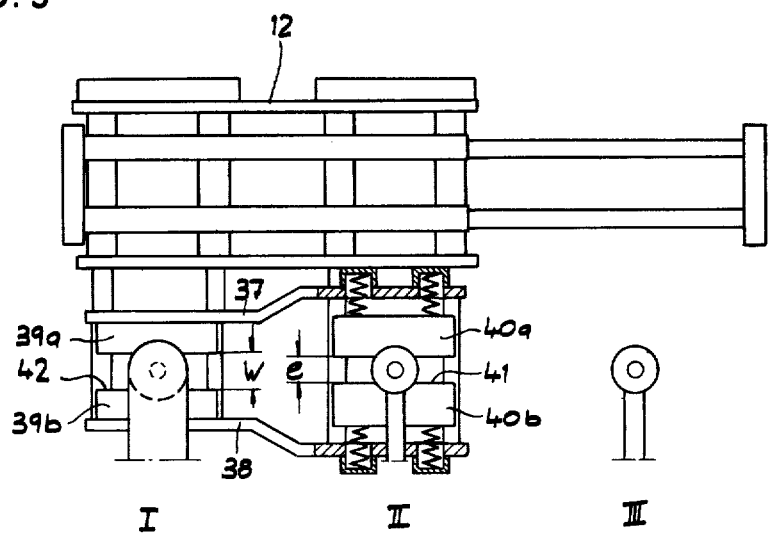
FIG. 5 is a plan view of a modified apparatus with the carriage shown in its first position and with each of the two molds in open position.
Figure 6:
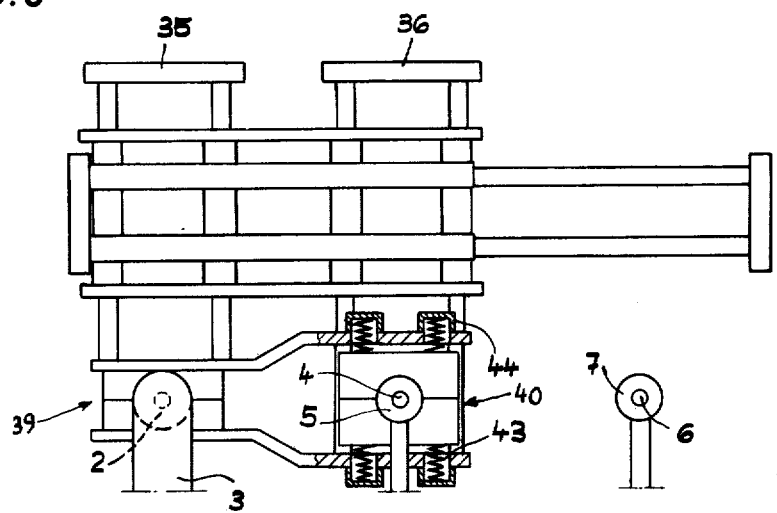
FIG. 6 is a plan view of the structure shown in FIG. 5 but with each of the two molds in closed position.

FIGS. 5 and 6 illustrate a further blowmolding apparatus wherein a single platen 37 replaces the platens 23a, 24a and a single platen 38 replaces the platens 23b, 24b. The sections 39a, 39b of the first mold 39 (corresponding to the mold 19 of FIGS. 1a–4b) are rigid with the platens 37, 38. The sections 40a, 40b of the second mold 40 (corresponding to the mold 20) are movable with respect to the platens 37, 38 and are biased toward each other by sets of springs 43. When the molds 39, 40 are open (FIG. 5), the distance w between the mold sections 39a, 39b exceeds the distance e between the mold sections 40a, 40b. Therefore, the mold 40 is closed prior to closing of the mold 39 when the platen 37 is caused to move toward the platen 38 and/or vice versa. Thus, the front surfaces 41 of the mold sections 40a, 40b come into contact with each other before the front surface 42 of the mold sections 39b engages the front surface of the mold sections 39a. Consequently, when the molds 39 and 40 are closed and are respectively located at the stations I and II, the mandrel 4 can be withdrawn from the mold 40 even before the stations 39a, 39b of the mold 39 engage each other at the station I. This is desirable and advantageous because the carriage 12 for the molds 39, 40 can be moved to its second position (in which the molds 39, 40 respectively dwell at the stations II and III) as soon as the mold 39 closes around a freshly extruded parison.

The illustrated helical springs 43 constitute but one of several types of yieldable mounting and biasing means which can be employed to move the sections 40a, 40b of the mold 40 relative to the respective platens 37, 38. When the mold 40 is closed, the springs 43 are compressed in the respective casings or retainers 44 on the platens 37 and 38. When the mold 40 is being opened at the station III to separate its sections 40a, 40b from a freshly formed hollow article which remains suspended on the mandrel 6, the springs 43 delay the opening of mold 40 because the platens 37, 38 begin to move the sections 40a, 40b away from each other only after the springs 43 dissipate energy which has been stored during closing of the mold 40. Such delayed opening of the mold 40 is not detrimental. For example, if the mandrel 6 at the station III is retracted prior to complete opening of the mold 40 or even before the mold 40 begins to open at the station III, the sections 40a, 40b entrain the finished hollow shaped article toward the station II and allow such article to leave the cavity of the mold 40 before the latter reaches the station II. In other words, all that is necessary is to provide a means for intercepting shaped articles at a locus between the stations II and III rather than at a locus below the station III.

It is further within the purview of the invention to replace the discrete crossheads 35, 36 of the two operating means with a single crosshead. Also, the springs 43 can be replaced with other yieldable biasing and mounting means, such as dashpots, packages of dished springs, hydraulic or pneumatic cylinder and piston units which are equipped with pressure relief valves, and/or others.

The advantages of the improved blowmolding apparatus can be summarized as follows:

The first mold 19 or 39 need not be closed prior to complete extrusion of a full-length parison at the station I.

The first mold can leave the station I immediately after closing to thus prevent its sections from interfering with continuous extrusion of plasticized material, i.e., the closed first mold cannot flex, deform and/or otherwise affect the quality and/or appearance of the material which issues from the nozzle 2.

The second mold 20 or 40 leaves the station II for travel toward the station III only upon completed withdrawal of the mandrel 4.

The means for moving the carriage 12 between its positions and the operating means for the molds occupy little room and are of simple and compact construction.

The operation of the apparatus can be readily changed to enable the apparatus to produce differently dimensioned and/or shaped articles.

All of the parts, especially the sections of the molds, are readily accessible for inspection, repair and/or replacement.

It will be noted that, even though some of these features appear to be mutually exclusive, they can be embodied in a single apparatus by the simple expedient of providing operating means which renders it possible to open and close at least one of the two molds independently of the other mold.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for converting plasticised parisons of synthetic plastic material into hollow shaped articles by bi-axial stretching, comprising means for extruding a succession of parisons at a first station; a first blowing unit located at a second station laterally spaced from said first station and including means for expanding parisons into hollow blanks; a second blowing unit located at a third station laterally spaced from said second station and including means for expanding hollow blanks into shaped articles, said second station being located intermediate said first and third stations; first and second multi-section open-and-shut molds; means for moving said first between a first position in which it registers with said extruding means at said first station to receive a parison and a second position in which it registers with said first blowing, unit at said second station for expansion of said parison into a hollow blank, and for moving said second mold in unison with said first mold between a third position which it assumes when said first mold is in said first position and in which said second mold registers with said first blowing unit at said second station to accept a hollow blank and a fourth position which it assumes when said first mold is in said second position and in which said second mold registers with said second blowing unit at said third station for conversion of the blank in said second mold into a shaped article; and operating means for opening and closing at least one of said molds independently of the other of said molds.

2. Apparatus as defined in claim 1; and further comprising a carriage on which said first and second molds are mounted and which is moved in a predetermined path by said moving means for said molds to assume said positions thereof.

3. Apparatus as defined in claim 2, wherein said operating means includes means for moving the sections of said molds with respect to said carriage and substantially at right angles to the direction of movement of said carriage along said path.

4. Apparatus as defined in claim 2, wherein said operating means is mounted on and shares the movements of said carriage along said path.

5. Apparatus as defined in claim 2, wherein said operating means includes discrete first and second operating means for said first and second molds.

6. Apparatus as defined in claim 5, wherein each of said discrete operating means is mounted on and shares the movements of said carriage along said path, each of said discrete operating means including means for opening and closing the respective mold independently of the opening and closing of the other mold.

7. Apparatus as defined in claim 1, wherein said one mold is said first mold.

8. Apparatus as defined in claim 1, wherein each of said molds comprises a first and a second section and said operating means comprises a first platen for said first sections, a second platen for said second sections, means for yieldably mounting the sections of one of said molds on said platens so that the sections of said one mold are repeatedly movable through predetermined distances with respect to the corresponding platens and the respective sections of the other of said molds, and means for moving at least one of said platens with respect to the other of said platens.

9. Apparatus as defined in claim 8, wherein the closing of said mold having said yielding mounted sections precedes the closing of the other of said molds whereby such closing of said mold having said yieldably mounted sections takes place against the operation of said mounting means.

10. Apparatus as defined in claim 9, wherein said mold having said yieldably mounted sections is said second mold.

11. Apparatus as defined in claim 9, wherein said mounted means includes springs.

* * * * *